United States Patent [19]

Buckingham

[11] 3,768,756

[45] Oct. 30, 1973

[54] COMMANDABLE SATELLITE ATTITUDE CONTROL APPARATUS

[75] Inventor: Arthur G. Buckingham, Baltimore, Md.

[73] Assignee: Westinghouse Electric Corporation, Pittsburgh, Pa.

[22] Filed: Sept. 21, 1967

[21] Appl. No.: 669,548

[52] U.S. Cl. .............................................. 244/1 SA
[51] Int. Cl. ............................................... B64g 1/00
[58] Field of Search .................. 244/1 SS, 1 SA; 343/100 SA, 705 S

[56] References Cited
UNITED STATES PATENTS

| | | | |
|---|---|---|---|
| 3,519,222 | 7/1970 | Altekruse et al. | 244/1 SA |
| 3,239,165 | 3/1966 | Sohn | 244/1 SS |
| 3,282,532 | 11/1966 | Tinling et al. | 244/1 SS |

Primary Examiner—Milton Buchler
Assistant Examiner—Stephen G. Kunin
Attorney—F. H. Henson, E. P. Klipfel and D. F. Straitiff

[57] ABSTRACT

An apparatus for changing the attitude of a satellite to obtain selective pointing responsively to input commands. A long thin-walled rigid vertical gravity gradient boom or rod is pivotally connected to the satellite body via an electrical torque motor which operates to introduce angular movement between the boom and the satellite body and thereby obtain a change in attitude of such satellite body with respect to a celestial reference. Employment of a two-axis torque motor provides for aiming of the satellite body with two degrees of freedom.

5 Claims, 5 Drawing Figures

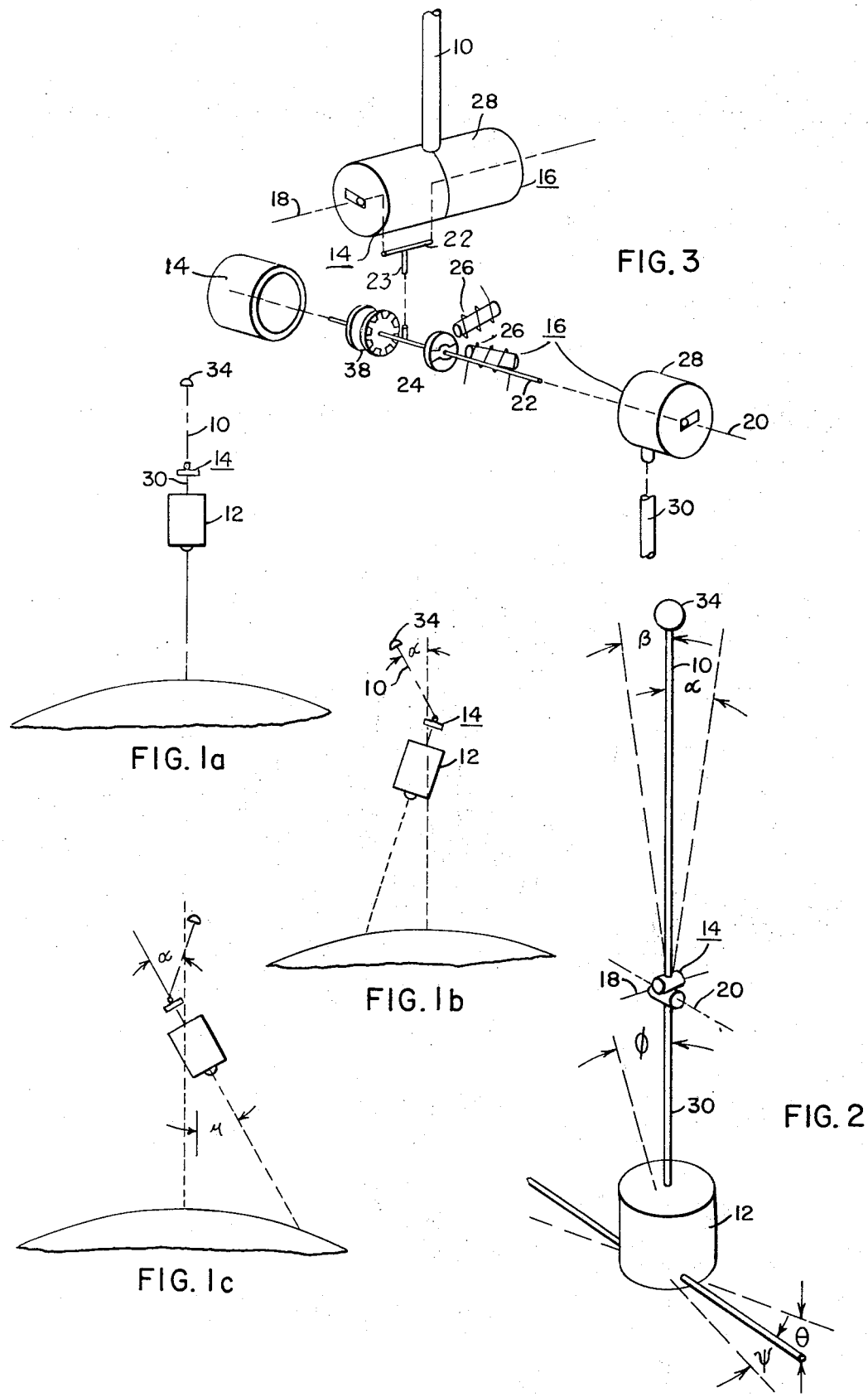

COMMANDABLE SATELLITE ATTITUDE CONTROL APPARATUS

BACKGROUND OF THE INVENTION

1. Field of the Invention

Satellite attitude changing apparatus.

2. Description of the Prior Art

Apparatus heretofore employed for changing the attitude of satellites have employed such as reaction jets or rotating flywheels that place considerable demand on operating medium aboard the satellite and thus tend to increase the load and to limit the useful life of the apparatus.

SUMMARY

The torque-motor-actuated gravity gradient rigid boom of the present invention for changing satellite body attitude enjoys the basic simplicity of gravity gradient type equipment.

BREIF DESCRIPTION OF THE DRAWING

In the drawing

FIGS. 1a, 1b and 1c are side elevation views exemplifying different changes in attitude of a satellite body corresponding to different angles of the gravity gradient boom as effected by the torque motor means, in accord with the invention;

FIG. 2 is a schematic three-dimensional representation of a satellite embodying the present invention; and FIG. 3 is an exploded view of a schematic representation of an exemplified torque motor means and damper assemblage suitable for employment in the present invention.

DESCRIPTION OF THE PREFERRED EMBODIMENT

Referring to the drawings, the satellite attitude changing apparatus in accord with the present invention comprises a hollow thin-walled boom or rod 10 which is pivotally connected to the satellite body 12 via a torque motor means 14.

The boom 10 is of the type which is stowed away in rolled-up form during launching of the artificial satellite and unfurled into a hollow rod form while in orbit in space, such as heretofore proposed for gravity gradient orientation of a satellite in alignment with the local vertical. Such a boom is effectively rigid at the force levels involved.

The torque motor means 14, in the exemplification shown schematically in FIG. 3, is electrical and includes a pair of torquer assemblies 16 arranged at right angles to actuate the boom 10 about respective mutually perpendicular axes 18 and 20; one of which axis 20, for example, will normally lie in the orbit plane, and the other will lie in a plane perpendicular to such orbit plane. Each torquer assembly comprises a shaft 22 to which is attached a radially aligned permanent magnet member 24 which is subjected to the torquing influence of circumferentially spaced apart electromagnets 26 attached to an outer cylindrical housing 28 of the torquer. The uppermost torquer housing 28 is attached to the lower end of the boom 10 for turning same, and the lowermost torquer housing 28 is attached to the satellite body 12 through the medium of such as a rigid mounting post 30 extending vertically from such body. Shafts 22, extending at right angles to one another, are interconnected by a rod 23.

By suitable energization of the electromagnets 26 in the torquer assemblies 16, selected degrees of turning bias is imposed between the boom 10 and the satellite body 12 about one or both axes 28 and/or 20. By virtue of the stiffness of the boom 10, its length, and a weight 34 at its projecting end, the relative angulation between boom and satellite body introduced by the torquer assemblies will result in change in attitude of such body with respect to a celestial reference, such as Earth or other primary body about which the artificial satellite is orbiting.

With the boom 10 pivotally connected to the satellite body along an axis of symmetry passing through its center of mass, for example, when the torquers remain de-energized and act as hinges, such boom and such axis will tend to align along the local vertical pointing toward the center of Earth or other primary body, as shown in FIG. 1a, in accord with the gravity gradient forces acting on the system. Librational energy is removed from the satellite by a rotary damper 38 in each torquer assembly, so that a stable position is obtained. When the torquers are energized to bias the satellite body 12 to an angulated position relative to the local vertical by reaction with the boom 10, other angulated gravity gradient positions of boom and body, such as shown in FIGS. 1b and 1c, for example, will be assumed, and rocking movement of the boom about the axes 18 and 20 of the torquer assemblies 16 at opposite sides of their positions urged by the bias of such torquer assemblies will result in removal of any librational energy from the system by the rotary dampers 38.

I claim as my invention:

1. Control apparatus for selective pointing a satellite body comprising:

an elongated rigid normally vertical gravity gradient rod having a bi-axial pivotal connection with said satellite body, and torque motor means interconnected between said elongated rigid gravity gradient rod and said satellite body for effecting aiming of said satellite body selectively to different angulated positions relative to the local vertical in response to input commands.

2. The apparatus of claim 1, wherein the torque motor means is operable to produce a yieldable bias force in a general direction while permitting oscillatory movement about such pivotal connection relative to such general direction, and the apparatus further comprises damping means affiliated with such pivotal connection to remove such oscillatory movement.

3. The apparatus of claim 1, wherein, the pivotal connection forms a part of said torque motor means.

4. The apparatus of claim 1, wherein, said torque motor means comprises electromagnetic means.

5. The apparatus of claim 1, wherein, said pivotal connection acts as a simple hinge and said gravity gradient rod tends to become aligned along the local vertical in the relaxed state of said torque motor means.

* * * * *